United States Patent
Musschoot et al.

(10) Patent No.: US 6,286,541 B1
(45) Date of Patent: Sep. 11, 2001

(54) MECHANICAL LEAK-PROOF COUPLING

(75) Inventors: Albert Musschoot, Barrington Hills; Oscar Mathis, Cary, both of IL (US)

(73) Assignee: General Kinematics Corporation, Barrington, IL (US)

(*) Notice: Subject to any disclaimer, the term of this patent is extended or adjusted under 35 U.S.C. 154(b) by 0 days.

(21) Appl. No.: 08/963,474

(22) Filed: Nov. 3, 1997

(51) Int. Cl.$^7$ .............................. G01M 3/02; F16L 55/00; F16L 55/168
(52) U.S. Cl. ................................ 137/312; 73/46; 285/10; 285/11
(58) Field of Search .............................. 137/312; 138/97, 138/98, 99; 73/40.5 R, 46, 49.1, 49.2, 49.8; 285/10, 373, 410, 414, 13, 11

(56) References Cited

U.S. PATENT DOCUMENTS

| | | | |
|---|---|---|---|
| 1,821,274 | * | 9/1931 | Plummer .............................. 285/11 |
| 1,994,169 | * | 3/1935 | Comins ................................. 285/11 |
| 2,378,607 | * | 6/1945 | Watts ................................... 137/240 |
| 2,485,316 | * | 10/1949 | Robbins, Jr. et al. ................ 137/240 |
| 2,630,293 | * | 3/1953 | Smith .................................. 137/240 |
| 3,310,322 | * | 3/1967 | Carroll ................................ 137/312 |
| 3,350,050 | * | 10/1967 | Buczala et al. ..................... 138/99 |
| 3,547,140 | * | 12/1970 | Hastings et al. .................... 137/240 |
| 3,550,638 | * | 12/1970 | Smith ................................. 138/99 |
| 3,949,596 | * | 4/1976 | Hawk ................................. 73/49.1 |
| 4,049,296 | * | 9/1977 | Harrison ............................ 138/99 |
| 4,171,142 | * | 10/1979 | Harrison ............................ 138/99 |
| 4,174,728 | * | 11/1979 | Usnick et al. ...................... 137/240 |
| 4,194,389 | * | 3/1980 | Laging ............................... 73/49.1 |
| 4,292,992 | * | 10/1981 | Bhide' ............................... 137/240 |
| 4,295,669 | * | 10/1981 | LaPrade et al. .................... 73/46 |
| 4,383,546 | * | 5/1983 | Walters, Jr. ........................ 137/240 |
| 5,209,105 | * | 5/1993 | Hasha et al. ....................... 73/49.1 |
| 5,251,472 | * | 10/1993 | Carlson et al. .................... 73/46 |
| 5,301,983 | * | 4/1994 | Porowski ........................... 138/99 |
| 5,533,760 | * | 7/1996 | Welch ................................. 137/312 |
| 5,665,903 | * | 9/1997 | Moran ................................ 73/49.1 |

* cited by examiner

Primary Examiner—George L. Walton
(74) Attorney, Agent, or Firm—Marshall, O'Toole, Gerstein, Murray & Borun (57) ABSTRACT

In order to provide a leak-proof coupling for a gas-carrying pipe having two pipe sections that are relatively movable, the coupling includes a first pipe section and a second pipe section that have respective coupling ends disposed in closely spaced adjacent relation to define a gap therebetween. The first pipe section has an upstream end in communication with a source of a pressurized gas and a first coupling end remote therefrom such that the upstream end receives the pressurized gas from the source and the gas then flows through the first pipe section from the upstream end to the first coupling end for discharge therefrom. The second pipe section has a second coupling end in communication with the first coupling end and receives the pressurized gas from the first pipe section and the gas then flows through the second pipe section from the second coupling end to the downstream end for discharge therefrom. Additionally, the coupling includes structure for providing a positive pressure differential in the region of the first and second coupling ends externally of the first and second pipe sections to prevent pressurized gas from being able to escape through the gap.

24 Claims, 5 Drawing Sheets

MECHANICAL LEAK-PROOF COUPLING

FIELD OF THE INVENTION

The present invention is generally directed to leak-proof couplings for conduits, pipes and the like and, more particularly, a mechanical leak-proof coupling for a gas-carrying pipe connected to a vibrating chamber.

BACKGROUND OF THE INVENTION

Over the years, a wide variety of different couplings have been developed for conduits, pipes and the like. These couplings have typically taken the form of mechanical couplings that are either rigid or semi-rigid in form, especially where there is a requirement that the coupling be leak-proof in applications where the conduit or pipe carries a liquid or gas therethrough. With such mechanical couplings, it has been commonplace to utilize a seal that is in contact with each of the adjoining ends of the conduit or pipe.

While the design of such couplings and seals has evolved to a significant extent, there exists certain applications where conventional rigid or semi-rigid mechanical couplings are not suitable. This is the case, for instance, whenever two conduit or pipe sections must be joined in a leak-proof manner while at the same time permitting some degree of relative movement therebetween. For this purpose, conventional mechanical couplings have not proven to be useful since they cannot accommodate the relative movement between the two conduit or pipe sections.

Unfortunately, conventional flexible couplings also may not be suitable for every application where a leak-proof connection is necessary between two relatively movable conduit or pipe sections. Most typical flexible couplings have taken the form of a sleeve of a flexible material such as rubber or the like, and there are many applications in which the conduit or pipe sections must carry a high temperature fluid or a fluid having corrosive or other deleterious characteristics. In these cases, it is difficult, if not impossible, to select a material for the conventional flexible coupling that is capable of withstanding the extreme environmental characteristics of the fluid.

Since the fluid would normally be in contact with the conventional flexible coupling through a gap between the ends of the two conduit or pipe sections, this problem is known to be especially critical for those applications in which the ends of the conduit or pipe sections must accommodate some degree of relative movement therebetween.

In one particular application, a pressurized gas is transferred from a stationary source to a vibrating chamber through a gas-carrying conduit or pipe. This application is one in which the vibrating chamber may comprise an integral portion of a vibratory fluidized bed that is utilized to reclaim foundry sand by burning off the binder. The gas-carrying conduit or pipe typically will include a first conduit or pipe section having both an upstream end connected to the stationary source for the pressurized gas and a spaced coupling end. The gas-carrying conduit or pipe will also include a second conduit or pipe section having both a second coupling end near the first coupling end of the first conduit or pipe section and a spaced downstream end connected to the vibrating chamber. This application typically utilizes pressurized air that is heated to a temperature of at least 600° F. and is delivered to the vibrating chamber for fluidizing sand in the vibratory fluidized bed. Due to the relative movement of the conduit or pipe sections caused by the vibrating motion, there must exist a gap between the first and second coupling ends thereof.

For this application, a conventional flexible mechanical coupling will be understood to present a problem in view of the high temperature of the pressurized air. There must necessarily be a way to accommodate the relative movement between the first and second coupling ends of the conduit or pipe sections, thereby requiring the gap therebetween, but this means that either the material of the flexible mechanical coupling must be such as to withstand the high temperature of the pressurized air, or the flexible mechanical coupling must be isolated from exposure to the hot pressurized air. In either case, any solution in the form of a conventional flexible mechanical coupling has quite necessarily been understood to be complex and expensive.

The present invention is directed to overcoming one or more of the foregoing problems while achieving one or more of the resulting objects by providing a unique mechanical leak-proof coupling.

SUMMARY OF THE INVENTION

It is an object of the present invention to provide a mechanical leak-proof coupling for a gas-carrying pipe. It is a further object of the invention to provide a leak-proof coupling for a gas-carrying pipe having a pair of communicating pipe sections in an apparatus suitable for transferring a pressurized gas from a stationary source to a vibrating chamber through the gas-carrying pipe sections. It is a further object of the present invention to provide such a mechanical leak-proof coupling for transferring hot pressurized air.

Accordingly, the present invention is directed to a leak-proof coupling for a gas-carrying pipe which includes a first pipe section having an upstream end which receives a pressurized gas from a source and which also includes a second pipe section having a downstream end for discharge of the pressurized gas therefrom. The pressurized gas is received through the upstream end of the first pipe section from a source and flows through the first pipe section from the upstream end to a first coupling end for discharge therefrom. The pressurized gas is then received by a second coupling end of the second pipe section and flows through the second pipe section from the second coupling end to the downstream end for discharge therefrom. Still additionally, the first and second coupling ends of the first and second pipe sections are disposed in closely spaced adjacent relation to define a gap therebetween through which at least some of the pressurized gas could escape in the event of a negative pressure differential in the region of the first and second coupling ends externally of the first and second pipe sections.

In the context of this invention, it will be understood that the term "leak-proof" has reference to an arrangement in which the vast majority of gas is confined to flow through the gas-carrying pipe but does not exclude the possibility that relatively small amounts of gas may escape to atmosphere through the coupling. Also, in the context of this invention, it will be understood that the term "negative pressure differential" has reference to a condition in which the static pressure as measured externally of the first and second coupling ends would be lower than the static pressure as measured internally of the first and second coupling ends.

With this arrangement, the present invention achieves the mechanical leak-proof coupling by utilizing means for providing a positive pressure differential in the region of the first and second coupling ends externally of the first and second pipe sections to thereby prevent the pressurized gas flowing through the first and second pipe sections from being able to escape through the gap defined by the first and second coupling ends of the first and second pipe sections.

As will be appreciated, and again in the context of the present invention, the term "positive pressure differential" has reference to a condition in which the static pressure as measured externally of the first and second coupling ends is higher than the static pressure as measured internally of the first and second coupling ends.

In one form of the invention, the positive pressure differential means includes enclosure means located externally of the first and second pipe sections and in communication with a second source of pressurized gas. In another form of the invention, the positive pressure differential means includes groove means externally of the first and second pipe sections in communication with a second source of pressurized gas. In yet another form of the invention, the positive pressure differential means comprises an annular pressurized region surrounding the first and second coupling ends of the first and second pipe sections, respectively.

In one preferred embodiment, the annular pressurized region is defined by a flexible sleeve joined in sealed relation to the first and second pipe sections generally adjacent the first and second coupling ends. In another preferred embodiment, the annular pressurized region is defined by rigid annular wall portions joined in sealed relation to the respective first and second pipe sections generally adjacent the first and second coupling ends. In yet another preferred embodiment, the annular pressurized region is defined by an annular groove in one of the first and second coupling ends in confronting relation to the other of the first and second coupling ends.

In a highly preferred embodiment, an apparatus for transferring a pressurized gas from a stationary source to a vibrating chamber through a gas-carrying pipe includes a leak-proof coupling. The coupling comprises a first pipe section having an upstream gas-receiving end in communication with a stationary source of pressurized gas and a first coupling end remote therefrom. The upstream end receives the pressurized gas from the stationary source and the pressurized gas flows through the first pipe section from the upstream end to the first coupling end for discharge therefrom. The coupling also comprises a second pipe section having a second coupling end in communication with the first coupling end and a downstream end remote therefrom. The second coupling end receives the pressurized gas from the first pipe section and the pressurized gas then flows through the second pipe section from the second coupling end to the downstream end for discharge therefrom. Still additionally, a chamber is connected to the downstream end of the second pipe section to receive the pressurized gas discharged therefrom and means are provided for vibrating the chamber thereby also causing the second pipe section to vibrate therewith.

More specifically, the first pipe section is mounted in isolation from the chamber vibrating means such that the second coupling end of the second pipe section vibrates relative to the first coupling end of the first pipe section. The first and second coupling ends are disposed in closely spaced adjacent relation in this highly preferred embodiment to define a gap through which at least some of the pressurized gas could escape while flowing to the chamber in the event of a negative pressure differential in the region of the first and second coupling ends externally of the first and second pipe sections. With this arrangement, an enclosure means in the form of a flexible sleeve is located externally of the first and second pipe sections in communication with a second source of pressurized gas and joined in sealed relation to the first and second pipe sections to provide a positive pressure differential therein.

In another highly preferred embodiment, the enclosure means is defined by a pair of substantially rigid annular wall portions located externally of the first and second pipe sections and in communication with a second source of pressurized gas, and these wall portions are joined in sealed relation to the respective ones of the first and second pipe sections at points in spaced adjacent relation to the corresponding ones of the first and second coupling ends. In this manner, the apparatus provides a positive pressure differential in the region of the first and second coupling ends externally of the first and second pipe sections to thereby prevent the pressurized gas flowing through the first and second pipe sections from escaping through the gap defined by the first and second coupling ends thereof.

In yet another highly preferred embodiment, a groove means defined by a continuous annular groove in one of the first and second coupling ends so as to be in confronting relation to the other of the first and second coupling ends is located externally of the first and second pipe sections in communication with a second source of pressurized gas. In this manner, the apparatus provides a positive pressure differential in the region of the first and second coupling ends externally of the first and second pipe sections to thereby prevent the pressurized gas flowing through the first and second pipe sections from escaping through the gap defined by the first and second coupling ends thereof.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
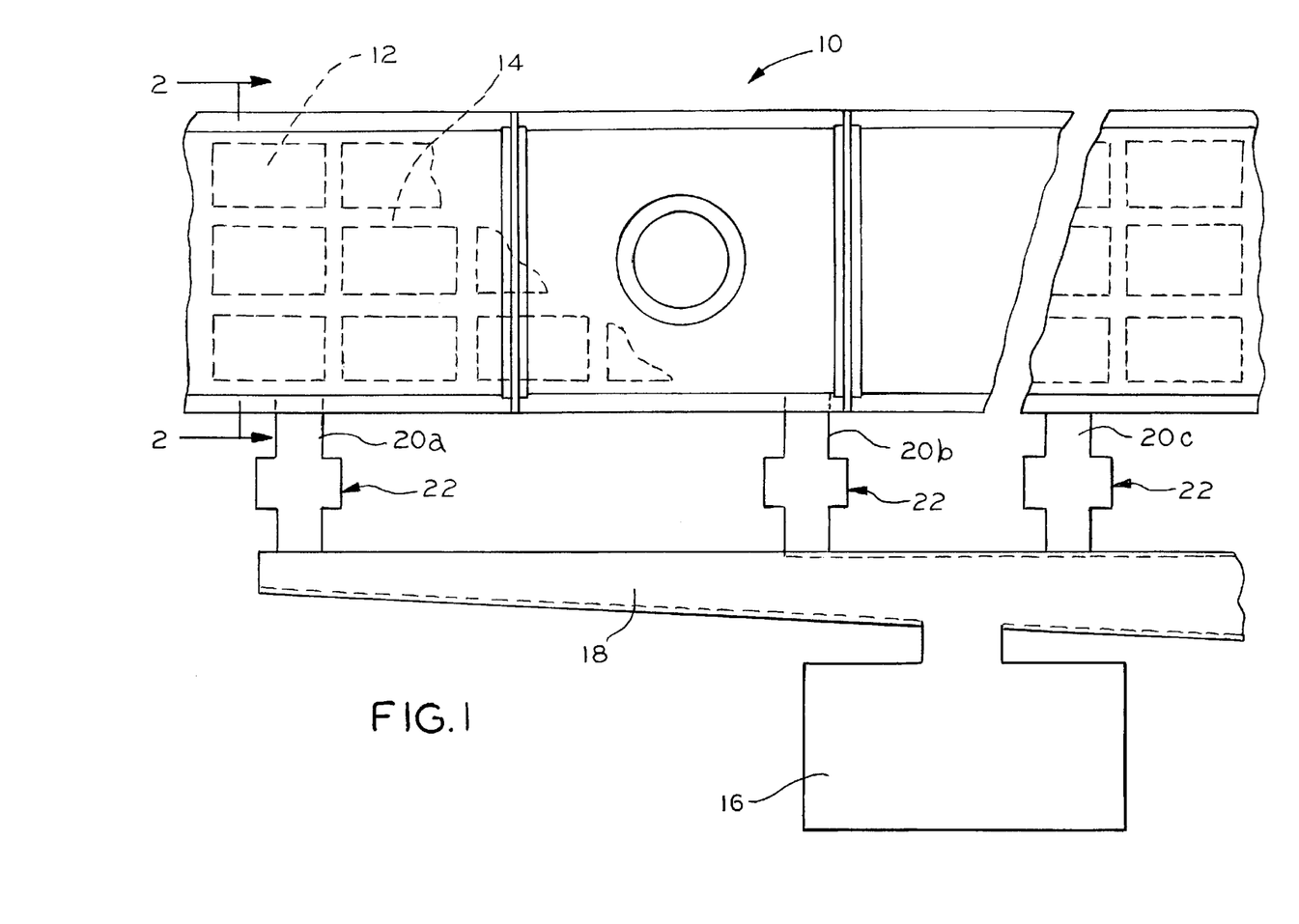
FIG. 1 is a plan view of a vibratory fluidized bed utilizing a mechanical leak-proof coupling in accordance with the present invention.
Figure 2:
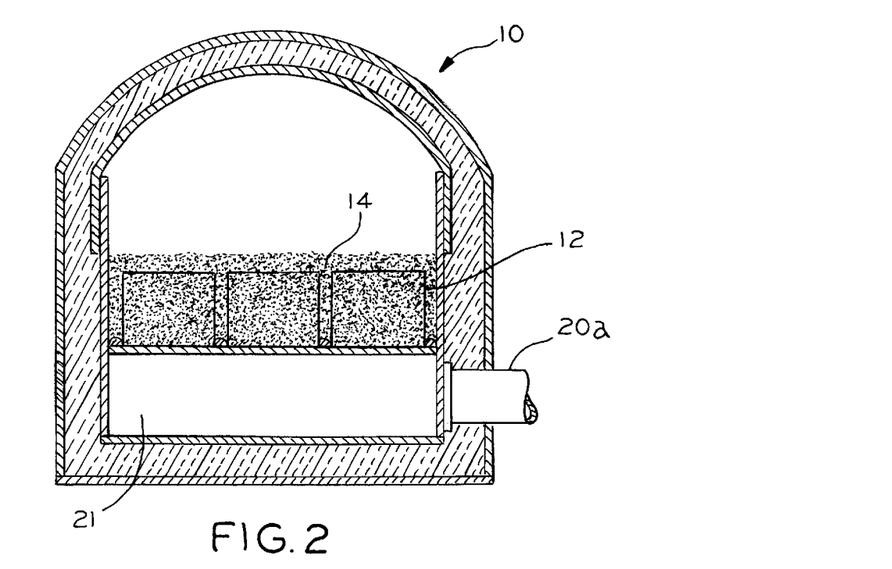
FIG. 2 is a cross-sectional view taken generally along the lines 2—2 of FIG. 1.

In the illustrations given, and with reference first to FIGS. 1 and 2, the reference numeral 10 designates generally an apparatus and system for removing and reclaiming sand from a metal casting in accordance with a commonly owned, co-pending patent application of Albert Musschoot for Vibratory Sand Reclamation System, U.S. Ser. No. 08/770, 343, filed Dec. 20, 1996, now U.S. Pat. No. 5,924,473. The teachings of the aforementioned co-pending patent application are incorporated herein by reference wherein the apparatus 10 is utilized to process metal castings such as 12, each having its sand mold and sand cores still in place as it follows a continuous, vibrated path extending from a casting loading conveyor (not shown) to a casting entrance (not shown) of a fluidized bed 14 while processing takes place. As pertinent to the present invention, hot, pressurized air is fed to a distribution manifold 18 where it passes through a plurality of hot, pressurized air-carrying conduits or pipes 20a, 20b, 20c, etc. into a vibrating distribution chamber 21 located beneath the fluidized bed 14 for passage through a permeable surface in the fluidized bed 14 such as a perforated plate or other suitable means preferably having one or more openings to provide for passage and distribution of the fluidizing hot, pressurized air. As will be appreciated, the permeable surface thereby accommodates the requirement for the hot, pressurized air to pass from beneath the vibratory fluidized bed 14 into sand within the vibratory fluidized bed 14 to cause the sand to become fluidized in accordance with the teachings of U.S. Ser. No. 08/770,343, filed Dec. 20, 1996, now U.S. Pat. No. 5,924,473, which has been incorporated herein by reference.

As will be recognized by those skilled in the art, the hot, pressurized air fed to the vibrating distribution chamber beneath the vibratory fluidized bed 14 is forced through suitable openings located substantially entirely along the permeable surface into the sand bed surrounding the sand molds containing the metal castings 12. The hot, pressurized air thereby fluidizes and further heats the sand in the vibratory fluidized bed 14 to pyrolyze the resin bonding material in the sand molds and sand cores. As the sand molds containing the metal castings 12 move through the heated chamber surrounding the vibratory fluidized bed 14, the binder in the sand molds and sand cores pyrolyzes, the pyrolyzed binder is vented from the vibratory fluidized bed through suitable vent stacks at the top of the heated chamber, and the reclaimed sand from the sand molds and sand cores mixes with the fluidized sand about the metal castings 12.

As for other details of the apparatus and system 10, they may be derived by reference to the teachings of the aforementioned co-pending patent application which have been incorporated herein by reference.

Figure 3:
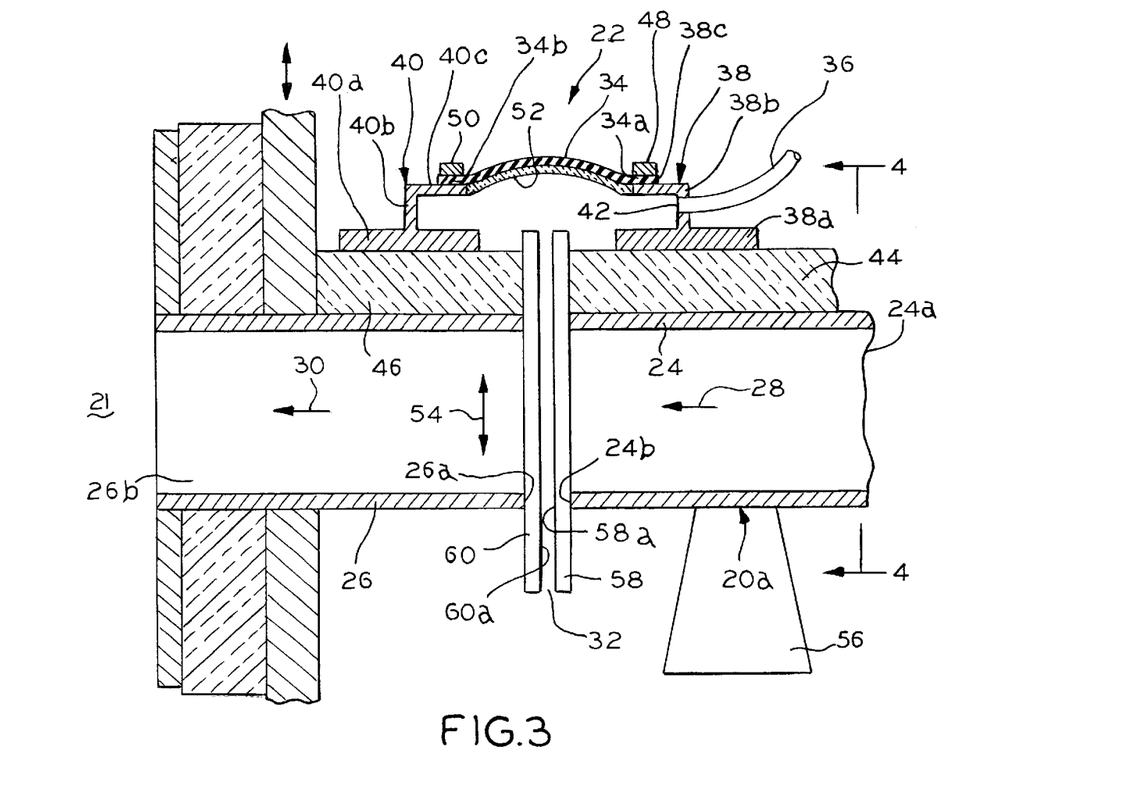
FIG. 3 is a longitudinal cross-sectional view of one form of mechanical leak-proof coupling in accordance with the present invention.
Figure 4:
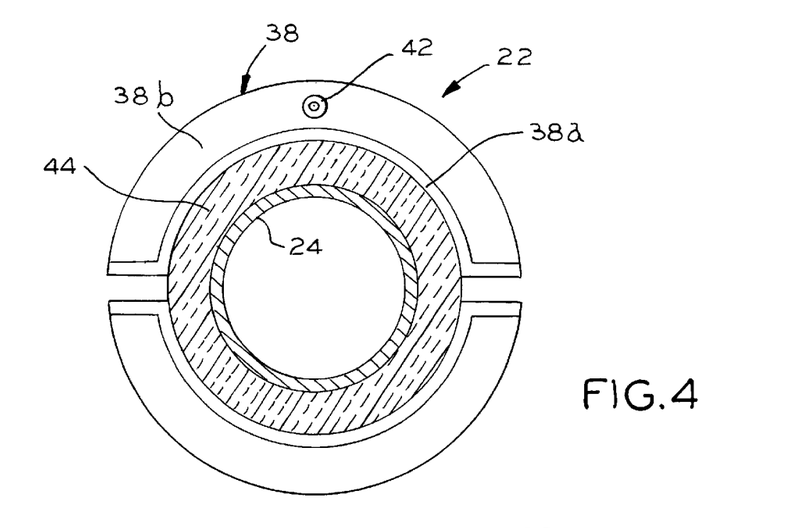
FIG. 4 is a cross-sectional view taken generally along the line 4—4 of FIG. 3.

Referring now to FIGS. 3 and 4, the details of the present invention, which have been shown in one preferred embodiment for use with an apparatus and system such as 10, can be fully understood. It will be appreciated in this connection that the present invention has been shown in conjunction with the apparatus and system 10 merely for illustrative purposes as to one potentially significant application. Of course, the present invention including each of the embodiments that has been disclosed herein can also be of significant benefit in a wide variety of other applications that will occur to those skilled in the art.

As specifically illustrated in FIG. 3, the present invention is directed to a leak-proof coupling designated 22 for a gas-carrying pipe such as 20a, 20b, 20c, etc. having a first pipe section 24 and a second pipe section 26. The first pipe section 24 has an upstream gas-receiving end 24a in communication with a source of pressurized gas, such as the heater or furnace 16, and a first coupling end 24b downstream and remote therefrom. The upstream gas-receiving end 24a of the first pipe section 24 receives the pressurized gas from the heater or furnace 16 after it has been discharged into the distribution manifold 18 in the case of the apparatus and system 10 shown in FIG. 1. As will be appreciated by the arrow 28 in FIG. 3, the pressurized gas received from the distribution manifold 18 flows through the first pipe section 24 from the upstream end 24a to the first coupling end 24b for discharge therefrom.

As will also be appreciated from FIG. 3, the second pipe section 26 has a second coupling end 26a in communication with the first coupling end 24b of the first pipe section 24 and a downstream end 26b remote therefrom. The second coupling end 26a receives the pressurized gas from the first pipe section 24 after it is discharged from the first coupling end 24b thereof. Further, the pressurized gas then flows through the second pipe section 26, as indicated by the arrow 30, from the second coupling end 26a to the downstream end 26b for discharge into the vibrating distribution chamber 21.

As shown clearly in FIG. 3, the first and second coupling ends 24b and 26a of the first and second pipe sections 24 and 26, respectively, are disposed in closely spaced adjacent relation such that they define a gap generally designated 32 therebetween. This gap 32 is such that the first and second pipe sections 24 and 26 are not in close enough proximity that they could normally prevent escape of the pressurized gas flowing through the first and second pipe sections 24 and 26 as represented by the arrows 28 and 30, respectively, but are such that the first and second pipe sections 24 and 26 are in communication through the gap 32 with external conditions, i.e., the gap 32 is sufficient that at least some of the pressurized gas could escape while flowing through the first and second pipe sections 24 and 26 in the event of a negative pressure differential in the region of the first and second coupling ends 24b and 26a externally of the first and second pipe sections 24 and 26. Thus, the leak-proof coupling 22 includes means for providing a positive pressure differential in the region of the first and second coupling ends 24b and 26a externally of the first and second pipe sections 24 and 26 to thereby prevent the pressurized gas from escaping through the gap 32.

More specifically, the positive pressure differential means includes enclosure means in the form of a flexible sleeve 34 located externally of the first and second pipe sections 24 and 26 in communication with a second source of pressurized gas through a tube 36 or the like. The flexible sleeve 34 is joined in sealed relation relative to the first and second pipe sections 24 and 26 at a point in spaced adjacent relation to the first and second coupling ends 24b and 26a. This is accomplished by providing respective flanges 38 and 40 (FIGS. 3 and 4) which surround the first and second pipe sections 24 and 26. The flexible sleeve 34 has a first end 34a joined in sealed relation to one of the flanges 38 and a second end 34b joined in sealed relation to the other of the flanges 40 to define the enclosure means. With this arrangement, the source of pressurized gas externally of the first and second pipe sections 24 and 26 is in communication with the enclosure means through one or more holes 42 in the flange 38 through which the tube 36 communicates to pressurize the enclosure means.

With this arrangement, it will be appreciated that the source of pressurized gas in communication with the enclosure means will be provided at a pressure which is higher than the pressure of the pressurized gas flowing through the first and second pipe sections 24 and 26. Moreover, this communication occurs at a point externally of the first and second pipe sections 24 and 26. As a result, the source of pressurized gas which is in communication with the enclosure means through the tube 36 prevents the pressurized gas flowing through the first and second pipe sections 24 and 26 from escaping through the gap 32 due to the positive pressure differential.

As for other details of the mechanical coupling 22 illustrated in FIGS. 3 and 4, an insulation material as at 44 and 46 may surround each of the first and second pipe sections 24 and 26 in which case the flanges 38 and 40 each suitably include a band portion 38a and 40a surrounding the insulation material 44 and 46 in sealed engagement therewith. It will also be appreciated that each of the flanges 38 and 40 may include a generally L-shaped radially outwardly projecting flange portion defined by a radial wall 38b and 40b integral with and extending radially outwardly of the respective band portions 38a and 40a and a circumferential wall 38c and 40c extending in generally parallel spaced relation to the respective bands 38a and 40a at the outermost extent of the radial walls 38b and 40b, although it will be understood by those skilled in the art that this particular structure is not essential to achieving the benefits of the present invention. As shown in FIG. 3, if the generally L-shaped flange portions are used, the circumferential walls 38c and 40c extend axially inwardly from the respective radial walls 38b and 40b in a direction which is generally toward the gap 32 between the first and second coupling ends 24b and 26a of the first and second pipe sections 24 and 26.

With the present invention, it is possible for the pressurized gas flowing through the first and second pipe sections 24 and 26 to be at an elevated temperature significantly above a maximum design temperature for the material from which the flexible sleeve 34 is formed due to the positive pressure differential that exists within the enclosure means surrounding the first and second coupling ends 24b and 26a of the first and second pipe sections 24 and 26. To this end, the pressurized gas which is in communication with the enclosure means defined by the flexible sleeve 34 through the tube 36 is provided at a temperature below the maximum design temperature for the material of the flexible sleeve 34, and at a pressure greater than the pressure of the pressurized gas flowing through the first and second pipe sections 24 and 26. In this manner, a positive pressure differential is maintained in the region of the first and second coupling ends 24b and 26a externally of the first and second pipe sections 24 and 26 and the flexible sleeve 34 is protected from the temperature of the pressurized gas flowing through the first and second pipe sections 24 and 26 since it cannot escape through the gap 32 due to the positive pressure differential that is produced.

As shown in FIG. 3, and again if the generally L-shaped flange portions are used, a retaining band 48 and 50 is provided to secure each of the ends 34a and 34b of the flexible sleeve 34 to the respective circumferential walls 38c and 40c such that they are in sealed relation thereto. It will also be appreciated that an insulation material as at 52 may advantageously be provided on the inner surface of the flexible sleeve 34 facing the enclosure means to protect the material of the flexible sleeve 34 in the event of an interruption in delivery of the pressurized gas through the tube 36. As for the retaining bands 48 and 50, they maintain sealed engagement of the ends of the flexible sleeve 34 with the circumferential walls 38c and 40c as the second pipe section 26 vibrates generally in the direction of the double arrow 54 with the vibrating distribution chamber 21.

While not specifically shown herein, it will be appreciated that suitable means is provided for vibrating the vibrating distribution chamber 21 such as the one taught in U.S. Ser. No. 08/770,343, filed Dec. 20, 1996, now U.S. Pat. No. 5,924,473, which has been incorporated herein by reference. It will also be seen in FIG. 3 that the first pipe section 24 is advantageously mounted on a suitable base 56 so as to be in isolation from the chamber vibrating means such that the second coupling end 26a of the second pipe section 26 vibrates relative to the first coupling end 24b of the first pipe section 24. In the illustrated embodiment, the first and second pipe sections 24 and 26 have flanges 58 and 60 on the first and second coupling ends 24b and 26a defining the gap 32 therebetween to provide confronting flange surfaces 58a and 60a that are normally separated by the width of the gap 32.

During operation, the confronting surfaces 58a and 60a normally don't come into contact since the vibratory motion of the second pipe section 26 is generally transverse to the axis of the first and second pipe sections 24 and 26 as shown by the double arrow 54. It may be the case, however, that during start up or shutdown, or even during normal operation, the vibratory motion will be in an axial, transverse, or combination of directions that may cause the flange 60 to make contact with the flange 58 on the stationary first pipe section 24. If this occurs, the confronting surfaces 58a and 60a of the flanges 58 and 60 may rub together without damaging the first and second coupling ends 24b and 26a of the first and second pipe sections 24 and 26 since these surfaces are relatively large surfaces normally in generally parallel planes.

Figure 5:
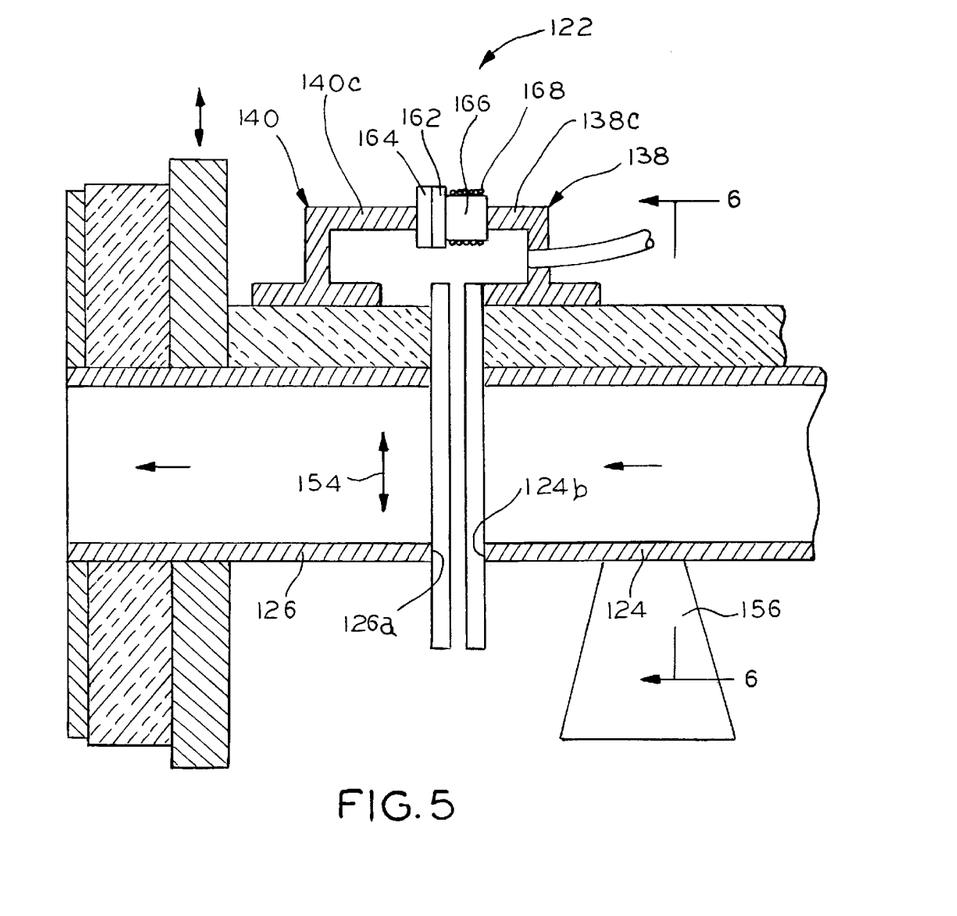
FIG. 5 is a longitudinal cross-sectional view of another form of mechanical leak-proof coupling in accordance with the present invention.
Figure 6:
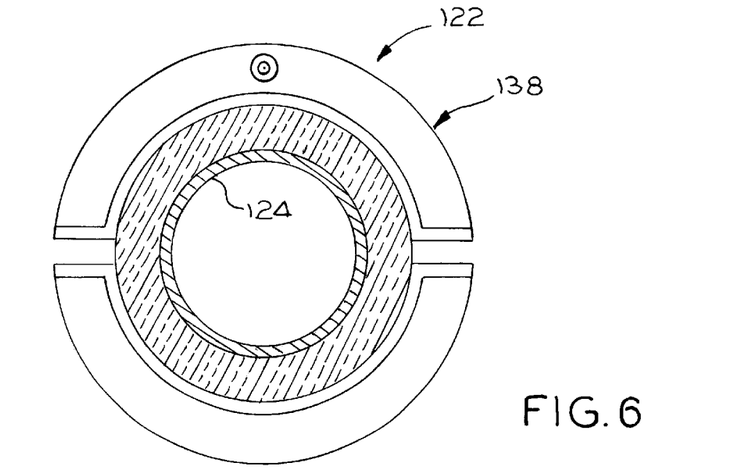
FIG. 6 is a cross-sectional view taken generally along the line 6—6 of FIG. 5.

Referring now to FIGS. 5 and 6, a mechanical coupling 122 is illustrated which is similar in a number of respects to the mechanical coupling 22 which has been illustrated and described in connection with FIGS. 3 and 4. It will be seen, however, that the mechanical coupling 122 includes enclosure means defined by a pair of substantially rigid circumferential or annular wall portions 138c and 140c each of which is joined in sealed relation to one of the first and second pipe sections 124 and 126 at a point in spaced adjacent relation to the corresponding one of the first and second coupling ends 124b and 126a. More specifically, the circumferential or annular wall portions 138c and 140c may each be defined by a portion of a generally L-shaped flange 138 and 140 surrounding a respective one of the first and second pipe sections 124 and 126 at the respective points in spaced relation to the first and second coupling ends 124b and 126a.

Unlike the flanges 38 and 40 of the mechanical coupling 22 which was described in connection with FIGS. 3 and 4, the circumferential or annular wall portions 138c and 140c have respective abutment ends in sealed engagement with one another to define the enclosure means. The abutment ends 162 and 164 may advantageously comprise graphite rub rings with one of the rub rings 164 being integrally associated with its corresponding circumferential or annular wall portion 140c and the other of the rub rings 162 mounted on an annular collar 166 which is associated with the other of the circumferential or annular wall portions 138c. As shown in FIG. 5, a spring 168 is associated with the one of the circumferential or annular wall portions 138c for biasing the corresponding one of the rub rings 162 on the annular collar 166 toward the other of the rub rings 164 to maintain sealed engagement therebetween.

With the foregoing details of construction, the graphite rub rings maintain sealed engagement of the abutment ends 162 and 164 of the annular wall portions 138c and 140c as the second pipe section 126 is caused to vibrate with the vibrating distribution chamber 121 generally in the direction of the double arrow 154. This vibrational movement of the second pipe section 126 occurs in relation to the stationary first pipe section 124 that is mounted on the stationary base 156 and which, thus, does not undergo movement. As before noted, there may be some axial component of movement of the second pipe section 126 during start up and shutdown of the chamber vibrating means but this can be absorbed by axial movement of the annular collar 166 relative to the circumferential or annular wall portion 138c against the biasing force of the spring 168.

As for other details of the embodiment that is illustrated in FIGS. 5 and 6, they may advantageously take the same form as the corresponding structure that has been illustrated and described in conjunction with the embodiment of FIGS. 3 and 4.

Figure 7:
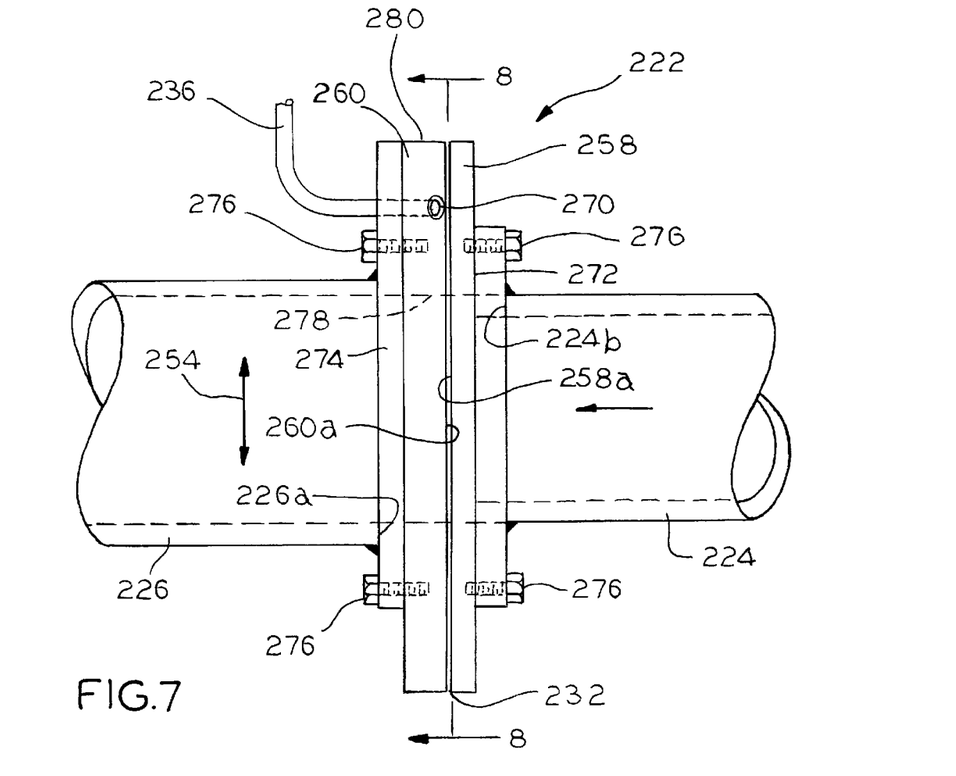
FIG. 7 is a side elevational view of yet another form of mechanical leak-proof coupling in accordance with the present invention.
Figure 8:
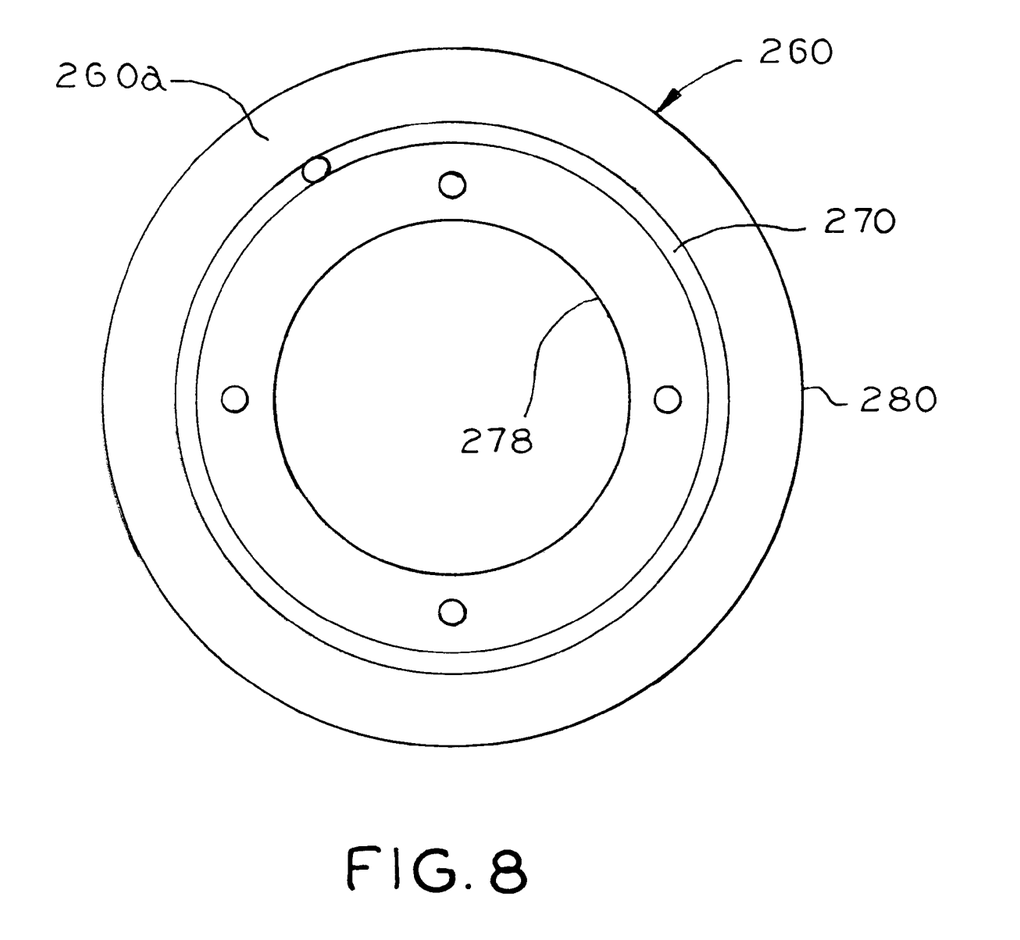
FIG. 8 is a cross-sectional view taken generally along the line 8—8 of FIG. 7.

Referring now to FIGS. 7 and 8, it will be appreciated that still another embodiment of mechanical coupling 222 has been illustrated which utilize the same principle of operation but a very different structure from the embodiments illustrated in FIGS. 3 and 4 and FIGS. 5 and 6. More specifically, the positive pressure differential means of the embodiment illustrated in FIGS. 7 and 8 does not include enclosure means of any type but, instead, includes groove means in the form of a continuous annular groove 270 located externally of the first and second pipe sections 224 and 226 in communication with a second source of pressurized gas through one or more tubes such as 236 wherein the pressurized gas from the second source is at a pressure higher than the pressure of the pressurized gas flowing through the first and second pipe sections 224 and 226. More specifically, the continuous annular groove 270 is associated with one of the first and second coupling ends 224b and 226a so as to be in confronting relation to the other of the first and second coupling ends 224b and 226a to provide an external positive pressure differential.

In the embodiment illustrated in FIGS. 7 and 8, the first and second coupling ends 224b and 226a each include a coupling flange 258 and 260, respectively, which extends radially outwardly of the corresponding one of the first and second coupling ends 224b and 226a. The continuous annular groove 270 is formed in one or the other of the coupling flanges, such as the coupling flange 260, so as to be positioned radially outwardly of the first and second pipe sections 224 and 226. It will also be seen that each of the first and second coupling ends 224b and 226a includes a mounting flange 272 and 274, respectively, which extends radially outwardly of the corresponding one of the first and second pipe sections 224 and 226. The coupling flanges 258 and 260 are each then mounted to the corresponding one of the mounting flanges 272 and 274 such that confronting surfaces 258a and 260a of the coupling flanges 258 and 260 serve to define the gap 232. With this arrangement, the continuous annular groove 270 will be seen to be formed in the confronting surface 260a of the one of the coupling flanges 260 so as to be radially outwardly of the first and second pipe sections 224 and 226 as previously mentioned.

With this construction, the coupling flange mounted to one of the mounting flanges is formed of cast iron, the coupling flange mounted to the other of the mounting flanges is formed of stainless steel, and each of the coupling flanges 258 and 260 is mounted to the corresponding one of the mounting flanges 272 and 274 on the first and second coupling ends 224b and 226a by removable fastening means such as threaded fasteners 276. The use of these different materials for the coupling flanges 258 and 260, i.e., cast iron and stainless steel, together with providing a relatively narrow gap 232 therebetween, is done to provide relatively low friction contact between the confronting surfaces 258a and 260a whenever there is any axial component to the vibrating movement of the second pipe section 226 relative to the stationary first pipe section 224 in the direction of the double arrows 254. By utilizing the removable threaded fasteners 276, the coupling flanges 258 and 260 can easily be removed and replaced when they are sufficiently worn from contact of the confronting surfaces 258a and 260a during start up and shutdown which produces an axial component of vibrating movement of the second pipe section 226 relative to the first pipe section 224 as previously described hereinabove.

As will be appreciated by referring to FIGS. 7 and 8, the continuous annular groove 270 is formed radially intermediate a radial inner limit 278 and a radial outer limit 280 of the coupling flanges 258 and 260. The location of the continuous annular groove 270 is selected to cause the pressurized gas from the second source delivered through the tube(s) 236 (which is at a higher pressure and lower temperature than the pressurized gas flowing through the first and second pipe sections 224 and 226) to be distributed completely circumferentially about the first and second coupling ends 224b and 226a, and the groove is advantageously shaped to produce a radially inward velocity of gas on the confronting surfaces 258a and 260a of the first and second coupling ends 224b and 226a. In this manner, an external positive pressure differential is provided to prevent the pressurized gas flowing through the first and second pipe sections 224 and 226 from escaping through the narrow gap 232.

With any of the foregoing embodiments, it will be appreciated that a leak-proof coupling for a gas-carrying pipe has been provided whenever it is important to prevent leakage of the gas whether due to the temperature of the gas or other environmental factors. A unique aspect of this leak-proof coupling involves the fact that it permits one pipe section to vibrate relative to a second pipe section where there is a gap between respective coupling ends thereof due to the utilization of a positive pressure differential generally in the region of the first and second coupling ends externally of the first and second pipe sections. In this manner, it is possible to prevent the pressurized gas which is flowing through the first and second pipe sections from being able to escape through the gap defined by the first and second coupling ends of the first and second pipe sections in a truly unique manner.

While in the foregoing there have been set forth preferred embodiments of the invention, it will be appreciated that the details herein given may be varied by those skilled in the art without departing from the true spirit and scope of the appended claims.

What is claimed is:

1. A leak-proof coupling for a gas-carrying pipe, comprising:

a first pipe section having an upstream gas-receiving end in communication with a source of pressurized gas and a first coupling end remote therefrom, said upstream gas-receiving end of said first pipe section receiving said pressurized gas from said source and accommodating flow of said pressurized gas from said source through said first pipe section, said pressurized gas flowing through said first pipe section from said upstream gas-receiving end to said first coupling end for discharge therefrom;

a second pipe section having a second coupling end in communication with said first coupling end and a downstream end remote therefrom, said second coupling end of said second pipe section receiving said pressurized gas from said first pipe section and accommodating flow of said pressurized gas from said first pipe section through said second pipe section, said pressurized gas flowing through said second pipe section from said second coupling end to said downstream end for discharge therefrom;

said first and second coupling ends being disposed in closely spaced adjacent relation to define a gap through which at least some of said pressurized gas could escape while flowing through said first and second pipe sections in the event of a negative pressure differential in the region of said first and second coupling ends externally of said first and second pipe sections, said second coupling end thereby being moveable relative to said first coupling end and said gap; and means for providing a positive gas pressure differential in the region of said first and second coupling ends externally of said first and second pipe sections to thereby prevent said pressurized gas flowing through said first and second pipe sections from being able to escape through said gap defined by said first and second coupling ends of said first and second pipe sections.

2. The leak-proof coupling of claim 1 wherein said positive gas pressure differential means includes enclosure means externally of said first and second pipe sections in communication with a second source of pressurized gas.

3. The leak-proof coupling of claim 1 wherein said positive gas pressure differential means includes groove means externally of said first and second pipe sections in communication with a second source of pressurized gas.

4. The leak-proof coupling of claim 1 wherein said positive gas pressure differential means comprises an annular pressurized region surrounding said first and second coupling ends of said first and second pipe sections, respectively.

5. The leak-proof coupling of claim 4 wherein said annular pressurized region is defined by a flexible sleeve joined in sealed relation to said first and second pipe sections generally adjacent said first and second coupling ends.

6. The leak-proof coupling of claim 4 wherein said annular pressurized region is defined by a pair of rigid annular wall portions each joined in sealed relation to one of said first and second pipe sections adjacent said first and second coupling ends.

7. The leak-proof coupling of claim 4 wherein said annular pressurized region is defined by an annular groove in one of said first and second coupling ends in confronting relation to the other of said first and second coupling ends.

8. In an apparatus for transferring a pressurized gas from a stationary source to a vibrating chamber through a leak-proof coupling for a gas-carrying pipe, the leak-proof coupling improvement comprising:

a first pipe section having an upstream gas-receiving end in communication with a stationary source of pressurized gas and a first coupling end remote therefrom and supported in fixed relation to said pressurized gas source, said upstream gas-receiving end of said first pipe section receiving said pressurized gas from said stationary source and accommodating flow of said pressurized gas from said source through said first pipe section, said pressurized gas flowing through said first pipe section from said upstream gas-receiving end to said first coupling end for discharge therefrom;

a second pipe section having a second coupling end in communication with said first coupling end and a downstream end remote therefrom, said second coupling end of said second pipe section receiving said pressurized gas from said first pipe section and accommodating flow of said pressurized gas from said first pipe section through said second pipe section, said pressurized gas flowing through said second pipe section from said second coupling end to said downstream end for discharge therefrom;

a chamber connected to said downstream end of said second pipe section to receive said pressurized gas discharged therefrom, said first and second pipe sections defining a flow path for said pressurized gas from said stationary source to said chamber, and means for vibrating said chamber thereby also causing said second pipe section to vibrate therewith and relative to said first coupling end;

said first and second coupling ends being disposed in closely spaced adjacent relation to define a gap through which at least some of said pressurized gas could escape while flowing through said first and second pipe sections in the event of a negative pressure differential in the region of said first and second coupling ends externally of said first and second pipe sections;

said first pipe section being mounted in isolation from said chamber vibrating means such that said second coupling end of said second pipe section vibrates relative to said first coupling end of said first pipe section; and means for providing a positive pressure differential in the region of said first and second coupling ends externally of said first and second pipe sections to thereby prevent said pressurized gas flowing through said first and second pipe sections from being able to escape through said gap defined by said first and second coupling ends of said first and second pipe sections;

said positive pressure differential means including enclosure means located externally of said first and second pipe sections in communication with a second source of pressurized gas, said enclosure means being defined by a flexible sleeve joined in sealed relation to said first and second pipe sections at a point in spaced adjacent relation to said first and second coupling ends.

9. The apparatus of claim 8 wherein said positive gas pressure differential means includes a flange surrounding each of said first and second pipe sections at said points in spaced relation to said first and second coupling ends, said flexible sleeve having a first end joined in sealed relation to one of said flanges and a second end joined in sealed relation to the other of said flanges to define said enclosure means.

10. The apparatus of claim 9 including a source of pressurized gas in communication with said enclosure means at a point externally of said first and second pipe sections at a pressure higher than the pressure of said pressurized gas flowing through said first and second pipe sections to thereby prevent said pressurized gas flowing through said first and second pipe sections from being able to escape through said gap.

11. The apparatus of claim 9 including an insulation material surrounding each of said first and second pipe sections, said flanges each including a band portion surrounding said insulation material in sealed engagement therewith and each including a generally L-shaped radially outwardly projecting flange portion, said flange portion having a circumferential wall extending in generally parallel spaced relation to said band.

12. The apparatus of claim 8 wherein said pressurized gas flowing through said first and second pipe sections is at a temperature above a first temperature, said flexible sleeve is formed of a material having a maximum design temperature below said first temperature, and said pressurized gas in communication with said enclosure means is at a temperature below said maximum design temperature for said material.

13. The apparatus of claim 11 including a retaining band for securing each of said ends of said flexible sleeve to said circumferential wall of one of said flange portions in sealed relation thereto, and including an insulation material on the surface of said flexible sleeve facing said enclosure means, said retaining bands maintaining sealed engagement of said flexible sleeve with said circumferential walls as said second pipe section vibrates with said chamber.

14. In an apparatus for transferring a pressurized gas from a stationary source to a vibrating chamber through a leak-proof coupling for a gas-carrying pipe, the leak-proof coupling improvement comprising:

a first pipe section having an upstream gas-receiving end in communication with a stationary source of pressurized gas and a first coupling end remote therefrom and supported in fixed relation to said pressurized gas source, said upstream gas-receiving end of said first pipe section receiving said pressurized gas from said stationary source and accommodating flow of said pressurized gas from said source through said first pipe section, said pressurized gas flowing through said first pipe section from said upstream gas-receiving end to said first coupling end for discharge therefrom;

a second pipe section having a second coupling end in communication with said first coupling end and a downstream end remote therefrom, said second coupling end of said second pipe section receiving said pressurized gas from said first pipe section and accommodating flow of said pressurized gas from said first pipe section through said second pipe section, said pressurized gas flowing through said second pipe section from said second coupling end to said downstream end for discharge therefrom;

a chamber connected to said downstream end of said second pipe section to receive said pressurized gas discharged therefrom, said first and second pipe sections defining a flow path for said pressurized gas from said stationary source to said chamber, and means for vibrating said chamber thereby also causing said second pipe section to vibrate therewith and relative to said first coupling end;

said first and second coupling ends being disposed in closely spaced adjacent relation to define a gap through which at least some of said pressurized gas could escape while flowing rough said first and second pipe sections in the event of a negative pressure differential in the region of said first and second coupling ends externally of said first and second pipe sections;

said first pipe section being mounted in isolation from said chamber vibrating means such that said second coupling end of said second pipe section vibrates relative to said first coupling end of said first pipe section; and means for providing a positive pressure differential in the region of said first and second coupling ends externally of said first and second pipe sections to thereby prevent said pressurized gas flowing through said first and second pipe sections from being able to escape through said gap defined by said first and second coupling ends of said first and second pipe sections;

said positive pressure differential means including enclosure means located externally of said first and second pipe sections in communication with a second source of pressurized gas, said enclosure means being defined by a pair of substantially rigid annular wall portions each of which is joined in sealed relation to one of said first and second pipe sections at a point in spaced adjacent relation to the corresponding one of said first and second coupling ends.

15. The apparatus of claim 14 wherein each of said annular wall portions is defined by a generally L-shaped flange surrounding one of said first and second pipe sections at said points in spaced relation to said first and second coupling ends, each of said annular wall portions having an abutment end in sealed engagement with an abutment end of the other of said annular wall portions to thereby define said enclosure means.

16. The apparatus of claim 15 including a source of pressurized gas in communication with said enclosure means at a point externally of said first and second pipe sections at a pressure higher than the pressure of said pressurized gas flowing through said first and second pipe sections to thereby prevent said pressurized gas flowing through said first and second pipe sections from being able to escape through said gap.

17. The apparatus of claim 15 including an insulation material surrounding each of said first and second pipe sections, said generally L-shaped flanges each including a band portion surrounding said insulation material in sealed engagement therewith and each including a radially outwardly projecting wall portion, each of said radially outwardly projecting wall portions terminating in one of said annular wall portions which extends in generally parallel spaced relation to said band.

18. The apparatus of claim 17 wherein each of said abutment ends of said annular wall portions comprises a graphite rub ring and further including means associated with one of said annular wall portions for biasing the corresponding one of said graphite rub rings toward the other of said graphite rub rings to maintain sealed engagement of said abutment ends of said annular wall portions as said second pipe section vibrates with said chamber.

19. In an apparatus for transferring a pressurized gas from a stationary source to a vibrating chamber through a leak-proof coupling for a gas-carrying pipe, the leak-proof coupling improvement comprising:

a first pipe section having an upstream gas-receiving end in communication with a stationary source of pressurized gas and a first coupling end remote therefrom and supported in fixed relation to said pressurized gas sources said upstream gas-receiving end of said first pipe section receiving said pressurized gas from said stationary source and accommodating flow of said pressurized gas from said source through said first pipe section, said pressurized gas flowing through said first pipe section from said upstream gas-receiving end to said first coupling end for discharge therefrom;

a second pipe section having a second coupling end in communication with said first coupling end and a downstream end remote therefrom, said second coupling end of said second pipe section receiving said pressurized gas from said first pipe section and accommodating flow of said pressurized gas from said first pipe section through said second pipe section, said pressurized gas flowing through said second pipe section from said second coupling end to said downstream end for discharge therefrom;

a chamber connected to said downstream end of said second pipe section to receive said pressurized gas discharged therefrom, said first and second pipe sections defining a flow path for said pressurized gas from said stationary source to said chamber, and means for vibrating said chamber thereby also causing said second pipe section to vibrate therewith and relative to said first coupling end;

said first and second coupling ends being disposed in closely spaced adjacent relation to define a gap through which at least some of said pressurized gas could escape while flowing through said first and second pipe sections in the event of a negative pressure differential in the region of said first and second coupling ends externally of said first and second pipe sections, said first pipe section being mounted in isolation from said chamber vibrating means such that said second coupling end of said second pipe section vibrates relative to said first coupling end of said first pipe section; and means for providing a positive pressure differential in the region of said first and second coupling ends externally of said first and second pipe sections to thereby prevent said pressurized gas flowing through said first and second pipe sections from being able to escape through said gap defined by said first and second coupling ends of said first and second pipe sections;

said positive pressure differential means including groove means associated with one of said first and second coupling ends externally of said first and second pipe sections in communication with a second source of pressurized gas.

20. The apparatus of claim 19 wherein each of said first and second coupling ends includes a coupling flange extending radially outwardly of the corresponding one of said first and second coupling ends and said continuous annular groove is formed in one of said coupling flanges so as to be positioned radially outwardly of said first and second pipe sections.

21. The apparatus of claim 20 wherein each of said first and second coupling ends includes a mounting flange extending radially outwardly of the corresponding one of said first and second pipe sections and said coupling flanges are each mounted to the corresponding one of said mounting flanges such that confronting surfaces of said coupling flanges define said gap.

22. The apparatus of claim 21 wherein said continuous annular groove is formed in said confronting surface of one of said coupling flanges radially outwardly of said first and second pipe sections and is in communication with a source of pressurized gas externally of said first and second pipe sections at a higher pressure than the pressure of said pressurized gas flowing through said first and second pipe sections.

23. The apparatus of claim 21 wherein said coupling flange mounted to one of said mounting flanges is formed of cast iron, said coupling flange mounted to the other of said mounting flanges is formed of stainless steel, and each of said coupling flanges is mounted to the corresponding one of said mounting flanges on said first and second coupling ends with removable fastening means.

24. The apparatus of claim 20 wherein said continuous annular groove is formed radially intermediate a radial inner limit and a radial outer limit of said coupling flanges to cause said pressurized gas from said second source to be distributed completely circumferentially about said first and second coupling ends both radially inwardly and radially outwardly on said confronting surfaces thereof.

* * * * *

UNITED STATES PATENT AND TRADEMARK OFFICE
CERTIFICATE OF CORRECTION

PATENT NO. : 6,286,541 B1 Page 1 of 1
DATED : September 11, 2001
INVENTOR(S) : Musschoot et al.

It is certified that error appears in the above-identified patent and that said Letters Patent is hereby corrected as shown below:

Column 13,
Line 46, "rough" should be -- trough --.

Column 14,
Line 45, "sources" should be -- source, --

Signed and Sealed this

Second Day of April, 2002

Attest:

JAMES E. ROGAN
*Attesting Officer*  *Director of the United States Patent and Trademark Office*